(12) United States Patent
Timmermans et al.

(10) Patent No.: US 6,602,141 B2
(45) Date of Patent: Aug. 5, 2003

(54) DRIVE LINE APPARATUS

(75) Inventors: Jos Timmermans, Dearborn, MI (US); Jean C. Raymond, Montreal (CA)

(73) Assignee: Altair Engineering, Inc., Troy, MI (US)

( * ) Notice: Subject to any disclaimer, the term of this patent is extended or adjusted under 35 U.S.C. 154(b) by 0 days.

(21) Appl. No.: 09/814,541

(22) Filed: Mar. 22, 2001

(65) Prior Publication Data

US 2001/0046902 A1 Nov. 29, 2001

Related U.S. Application Data

(60) Provisional application No. 60/191,162, filed on Mar. 22, 2000.

(51) Int. Cl.$^7$ ................................................ F16D 3/06
(52) U.S. Cl. ........................... 464/99; 464/162; 464/172
(58) Field of Search ........................... 464/114, 99, 115, 464/42, 117, 162, 163, 165, 183, 172; 192/107 R; 403/359.1, 359.6

(56) References Cited

U.S. PATENT DOCUMENTS

| | | | | |
|---|---|---|---|---|
| 112,641 A | * | 3/1871 | Shepard .................... 464/115 |
| 1,270,533 A | * | 6/1918 | Lombard ................ 464/167 X |
| 2,761,295 A | | 9/1956 | Davis |
| 3,603,435 A | * | 9/1971 | Buzzard et al. ......... 192/107 R |
| 3,754,411 A | | 8/1973 | Orain |
| 3,813,899 A | | 6/1974 | Abrahamer |
| 4,125,000 A | | 11/1978 | Grob |
| 4,185,475 A | | 1/1980 | Kleinschmidt et al. |
| 4,308,729 A | | 1/1982 | Condon |
| 4,379,707 A | | 4/1983 | Fisher ........................ 464/162 |
| 4,548,591 A | | 10/1985 | Haldric et al. ................ 464/89 |
| 4,552,544 A | | 11/1985 | Beckman et al. ........... 464/162 |
| 4,573,946 A | | 3/1986 | Brissette ..................... 464/133 |
| 4,580,996 A | | 4/1986 | Brissette ..................... 464/133 |
| 4,669,571 A | | 6/1987 | Kurde ....................... 180/73.3 |
| 4,819,755 A | | 4/1989 | Smemo et al. ............. 180/70.1 |
| 4,991,992 A | | 2/1991 | Gutfleisch ................... 403/359 |
| 5,188,195 A | | 2/1993 | Haustein ..................... 180/353 |
| 5,286,232 A | | 2/1994 | Engle ......................... 464/162 |
| 5,360,377 A | | 11/1994 | Fernandez .................. 464/162 |
| 5,624,318 A | | 4/1997 | Jacob et al. ................ 464/140 |
| 5,628,688 A | | 5/1997 | Eversole et al. ........... 464/162 |
| 5,716,276 A | | 2/1998 | Mangas et al. .............. 464/16 |
| 5,772,520 A | | 6/1998 | Nicholas et al. ........... 464/162 |
| 5,819,888 A | * | 10/1998 | Tamura et al. .......... 192/107 R |
| 5,827,122 A | * | 10/1998 | Kurian ....................... 464/162 |
| 5,836,823 A | | 11/1998 | Shellaberger .............. 464/134 |

FOREIGN PATENT DOCUMENTS

GB            201670   *   8/1923   .................. 464/99

OTHER PUBLICATIONS

Universal Joint and Driveshaft Design Manual, AE–7, Warrendale PA, Society of Automotive Engineers, Inc., pp. 39, 151 & 152, TJ1079.S62 1979.*

* cited by examiner

Primary Examiner—Gregory J. Binda
(74) Attorney, Agent, or Firm—Young & Basile, P.C.

(57) ABSTRACT

A drive line apparatus has a pair of tubular shafts configured to fit telescopically. The outer shaft has internal splines and the inner shaft has outer splines so that the shafts rotate in unison. Each of the outer and inner shaft has one partially closed end for coupling to a universal joint, wherein the joint connected to the partially closed end of the inner shaft is disposed within the inner shaft for further reducing the length of the drive line apparatus.

19 Claims, 3 Drawing Sheets

DRIVE LINE APPARATUS

This application claims benefit of U.S. Provisional Application No. 60/191,162 filed Mar. 22, 2000.

FIELD OF THE INVENTION

The invention relates to a drive line apparatus for use where there is limited space between a driving member and a driven member.

BACKGROUND OF THE INVENTION

The drive line shaft connects the transmission output to the differential at the rear wheel on rear drive vehicles. The rotary motion of the transmission output shaft is carried to the differential and from there to the wheel. The drive line shaft must change in length and angle as the wheels move up and down. To allow for these two variations, two or more universal joints and a slip joint are required. The universal joint accommodates a change in the drive angle. The slip joint accommodates a change in the length of the drive line.

In the conventional drive line shaft, the slip joint has outside splines on one shaft and matching internal spines on a mating hollow shaft. The splines cause the two shafts to rotate together and to permit the two to move endwise in relation to each other. This allows changes in the length of the propeller shaft as the rear axles move toward or away from the vehicle frame.

Some vehicles, such as busses, have the engine mounted at the rear. Due to the limited space available, short shafts and universal joints carry the engine power to the rear wheels. It would be desirable to provide the shortest transmission shaft possible without sacrificing the strength of the shaft to support bearing stresses.

SUMMARY OF THE INVENTION

In one aspect of the invention, a drive line apparatus is provided for connection between an output portion of a driving member and an input portion of a driven member wherein the output portion and input portion are each connectible to a universal joint, and the drive line apparatus includes an outer hollow shaft connectible to a universal joint and an inner hollow shaft connectible to another universal joint wherein the outer and inner hollow shafts are telescopically connected so that at least a portion of the inner hollow shaft is disposed within the outer shaft and at least a portion of the universal joint connectible to the inner shaft is disposable within the inner hollow shaft to minimize the total length of the drive line apparatus.

In another aspect of the invention, a drive line apparatus is provided for connection between an output portion of the driving member and an input portion on the driven member wherein the drive line apparatus includes an outer hollow shaft having at least one open end and an inner hollow shaft having at least one open end. The drive line apparatus further includes means for rotating the inner hollow shaft in unison with the outer hollow shaft. The drive line apparatus further includes means for connecting either the inner or outer hollow shaft to the output portion of the driving member and means for connecting the other of the inner or outer hollow shaft to the input portion of the driven member, wherein at least a portion of the connection means to the inner hollow shaft is disposed within the inner hollow member.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
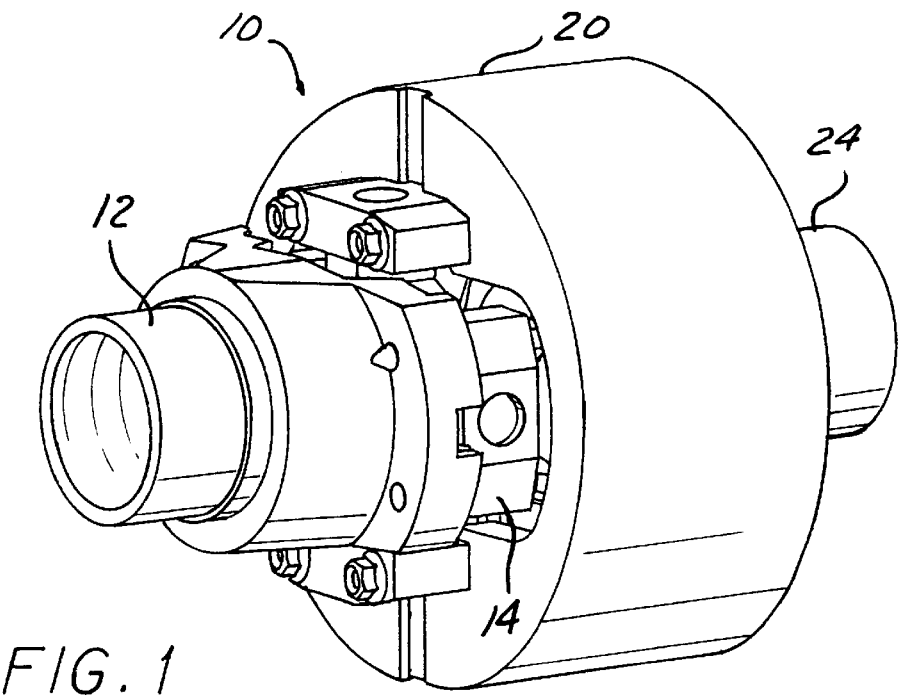
FIG. 1 is a perspective view of a shaft coupling incorporating the present invention.

Referring now to FIGS. 1–4, the drive line shaft 10 of the present invention includes a first yoke support 12, a first and second universal joint 14, 16, a second yoke support 24 and an improved shaft coupling 18 including an outer shaft member 20 and an inner shaft member 22. These components of the drive line apparatus 10 are all interconnected such that the distance between a driving member and a driven member, such as a transmission and differential or axle assembly, is maintained to a minimum.

The first and second yoke supports 12, 24, and the first and second universal joints 14, 16 are conventional devices currently used in the industry. Although many configurations are available for these devices, the Figures show just one example of devices rigidly connected to the output shaft of a driving unit, such as an engine or transmission and devices rigidly connected to the input shaft of a driven unit, such as a generator, transmission, or transfer box.

The shaft coupling 18 includes an outer shaft member 20 and an inner shaft member 22. Each of the outer and inner shaft members 20, 22 respectively, have a hollow interior. The outer shaft member 20 has an interior dimension for receiving at least a portion of the inner shaft member therein so that the outer and inner shaft members are telescopically connected and can have a common longitudinally extending rotational axis. The inner shaft member 22 has an interior dimension for receiving at least a portion of one of the universal joints 14, 16 therein. The dimensions of the outer and inner shaft members 20, 22 respectively are further dependent on the load and axial movement required for the application. In general, the outer and inner shaft members 20, 22, respectively, have a larger inner radius or areas than conventional drive line shafts.

Figure 3:
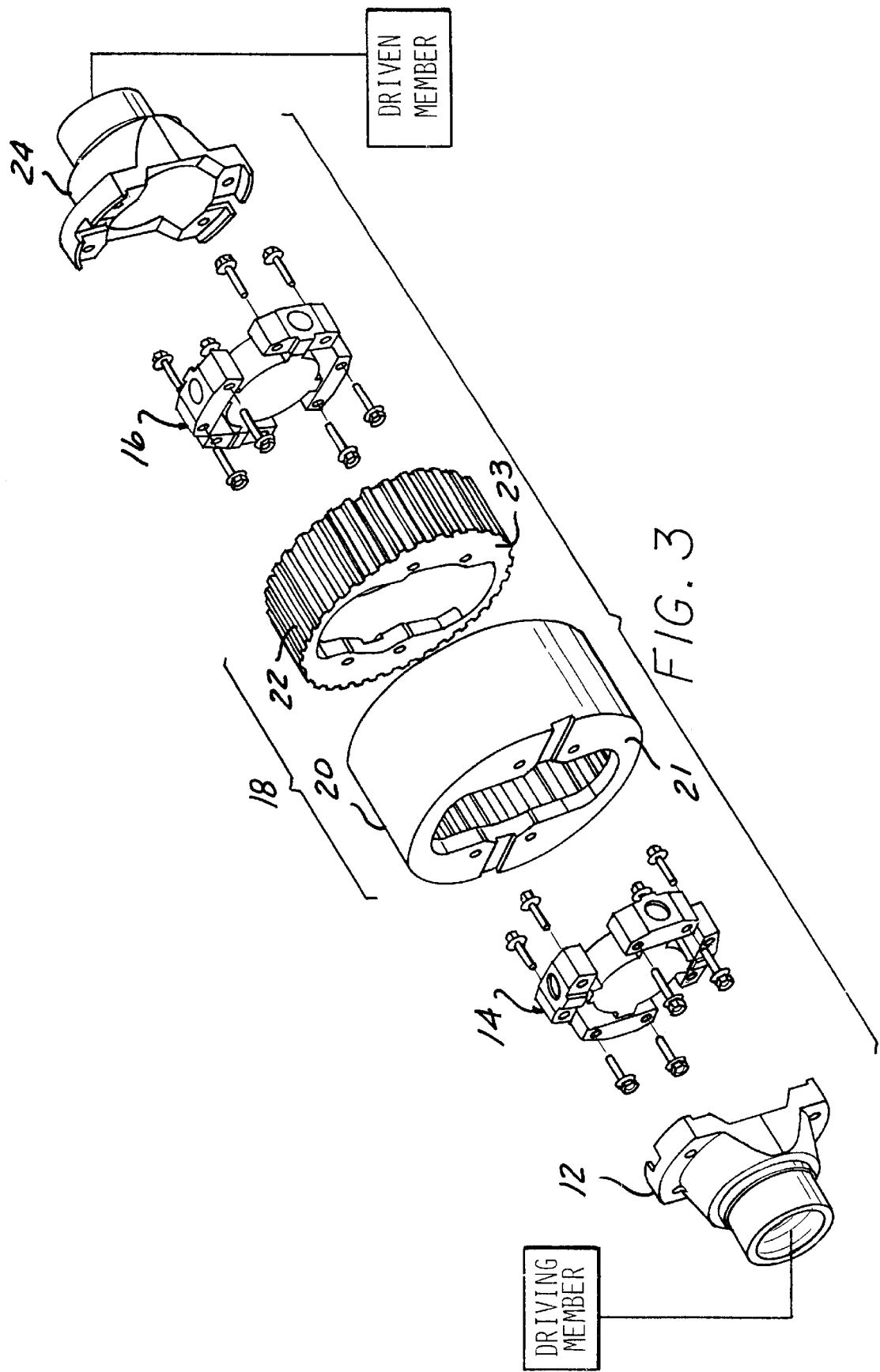
FIG. 3 is an exploded view of the shaft coupling showing the outer shaft member connected to a driving member and the inner shaft member connected to a driven member.

Each of the outer and inner shaft members 20, 22 respectively have means for rigid connection to one of the universal joints 14, 16. The means for rigid connection to one of the universal joints is positioned on each of the outer and inner shaft members 20, 22 to minimize the space between the first and second universal joints 14, 16 while allowing for relative axial movement between the outer and inner shaft members. FIG. 3 shows one example of means for rigid connection wherein each of the outer and inner shaft members 20, 22 have one flanged end. The flanged ends 21 and 23 of the outer and inner shaft members 20, 22 respectfully provide a surface area and mounting apertures for connection to the corresponding universal joint 14 and 16. To minimize the space between the first and second universal joints 14 and 16, the flanged ends 21 and 23 are oriented in the same direction for both outer and inner shaft members 20 and 22. In other words, the outer surfaces of the flanged ends 21, 23 of the outer shaft member 20 and inner shaft member 22, respectively, are oriented in the same longitudinal direction such that the outer surfaces of flanged ends 21, 23 are both facing either the driving member or driven member as best seen in FIG. 3.

The first universal joint 14 is provided for connection to the first yoke support 12 and adjacent components. The first universal joint 14 connects the outer shaft member 20 to the driving member (FIG. 3) or to the driven member (FIG. 4) via the first yoke support 12.

The second universal joint 16 can have the same configuration as the first universal joint 14. The second universal joint 16 connects the inner shaft member 22 to the driven member (FIG. 3) or to the driving member (FIG. 4) via the second yoke support 24. The yoke and universal joints shown in the Figures are only one example. Other configurations of coupling joints are known in the art.

Figure 4:
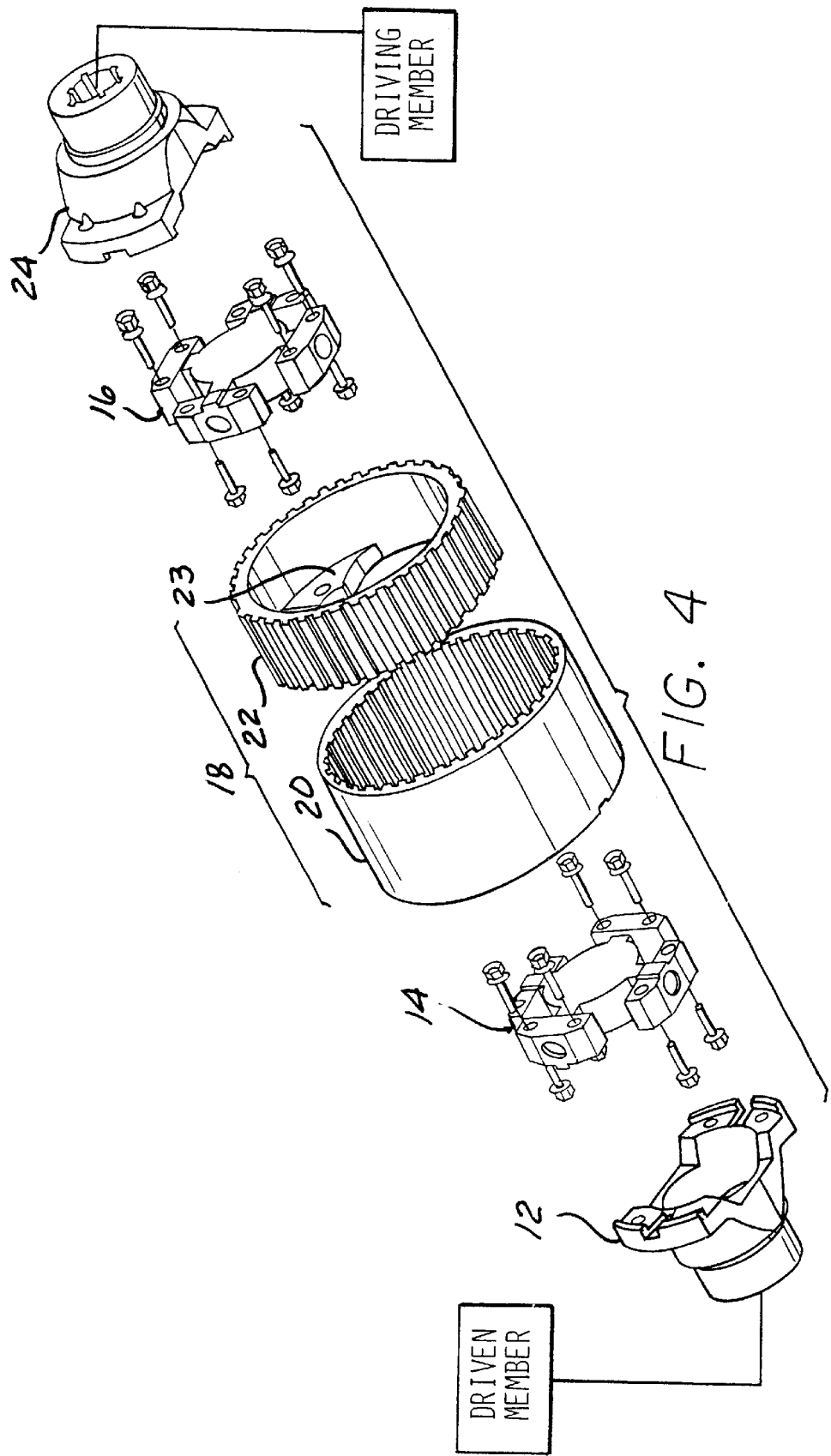
FIG. 4 is an exploded view of the shaft coupling reversed showing the inner shaft member connected to the driving member and the outer shaft member connected to the driven member.

In the illustrated embodiment, simultaneous rotation of the inner and outer shaft members is provided by splined surfaces. As seen in FIGS. 3 and 4 the inner peripheral wall of the outer shaft member 20 is splined, and an outer peripheral surface of the inner shaft member 22 is splined. The inner shaft member has an overall diameter slightly greater than the inner diameter of the outer shaft member 20 so that the outer splined peripheral surface of the inner shaft member 22 can be received within the inner diameter of the outer shaft member 20, while the splined surface of the outer shaft member 20 matingly mesh with the splined surface of the inner shaft member 22. As a result, the inner shaft member 22 rotates in unison with the outer shaft member 20.

Figure 2:
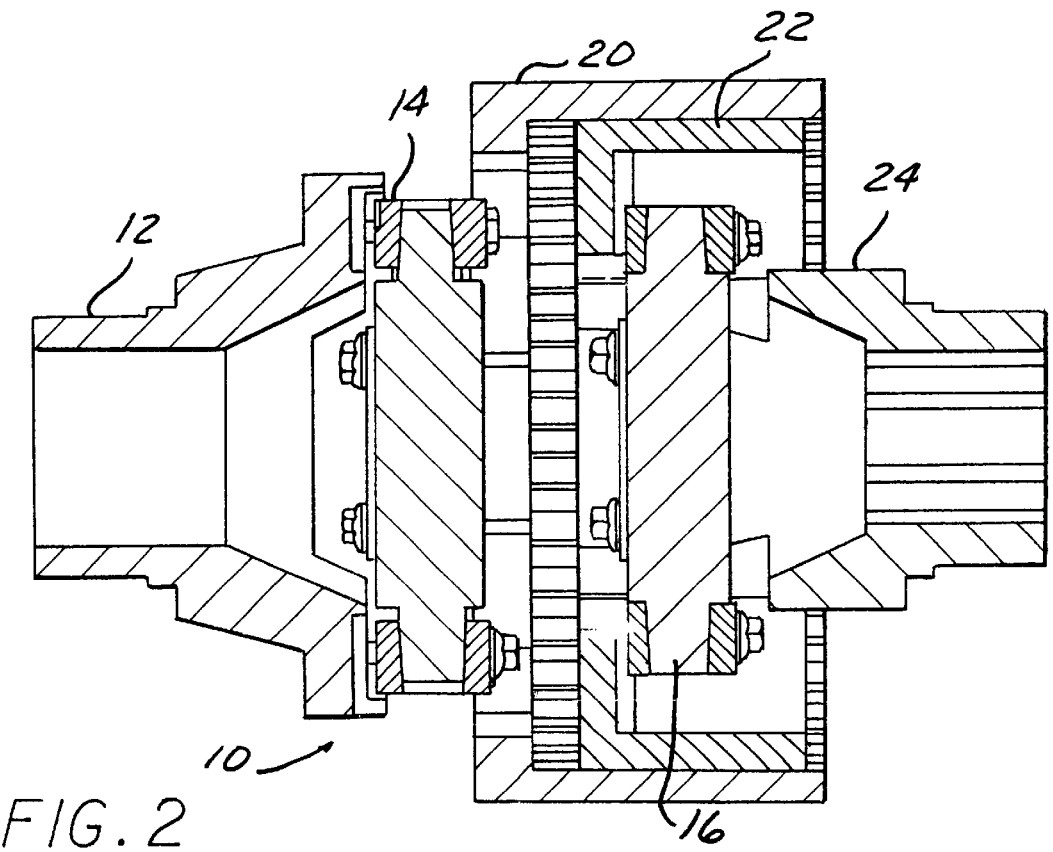
FIG. 2 is a cross sectional view of the shaft coupling in FIG. 1 showing an outer shaft member and inner shaft member of the shaft coupling.

The splined inner surface of the outer shaft member 20 and the splined outer surface of the inner shaft member 22 causes the two shaft members to rotate together and also permits the two shafts 20, 22 to move axially or endwise in relation to each other. This configuration allows changes in the length of the shaft as the rear axles move toward or away from the vehicle frame, as used in one application. The shaft coupling 18 replaces the tubular slip shafts of the prior art and allows the pair of universal joints 14, 16 to be positioned closer to each other by having the connection to second universal joint 16 of inner shaft member 22 moved toward the connection to the first universal joint 14 of the outer shaft member 20. This invention provides an advantage over the tubular slip joints of the prior art in that at least a portion of the universal joints can be encompassed within the shaft coupling 18 to minimize space required for the drive line. As seen in FIG. 2, the configuration of the preferred embodiment provides universal joint 16 to be positioned entirely within the inner shaft member 22.

Although the shaft coupling 18 has been described and shown as a cylindrical and splined device, it is apparent that other configurations are available for the shaft coupling 18. For example, the outer and inner hollow members forming the shaft coupling can be other geometric configurations. The shaft can be any three, four, or other multi-sided shaft. The inner and outer hollow members forming the shaft will have complementary surfaces causing the inner and outer hollow members to rotate in unison.

Further, the connectors of the shaft coupling to the output of the driving member and to the input of the driven member can vary from the illustrated embodiment. Other types of universal joints, such as a simple universal joint or a two-yoke-and-spider universal joint, are conventional. The inner and outer hollow shaft members 22, 20 can also include portions of the universal joint integral with the shaft members 22, 20 for connection directly to the yokes 12, 24.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadcast interpretation so as to encompass all such modifications and equivalent structures as is permitted under the law.

What is claimed is:

1. A drive line apparatus comprising:
    a first elongate hollow member having a first radially inwardly extending flange portion adjacent one longitudinal end;
    a second elongate hollow member having a second radially inwardly extending flange portion adjacent one longitudinal end with the first and second radially inwardly extending flanges adjacent the same longitudinal end of the assembled hollow members; and
    complementary surfaces operably inter-engaged between the first and second hollow members for transferring rotary motion from one hollow member to the other hollow member while allowing telescopic motion therebetween.

2. The apparatus of claim 1 further comprising:
    at least one of the first and second flanges having mounting apertures formed therein connectible to a universal joint to be positioned within a longitudinal length of the corresponding hollow member.

3. A drive line apparatus for connection between an output portion of a driving member and an input portion of a driven member comprising:
    a first hollow shaft;
    a second hollow shaft;
    means for connecting one of the hollow shafts to the output portion of the driving members;
    means for connecting the other hollow shaft to the input portion of the driven member, wherein at least a portion of one of the hollow shafts is disposed within the other hollow shaft and one of the connecting means is disposed within one of the hollow shafts;
    a flanged portion extending radially inward from a longitudinal end of the first hollow shaft; and
    a flanged portion extending radially inward from a longitudinal end of the second hollow shaft, each flanged portion being adjacent a common longitudinal end of the assembled hollow shafts, and further including an inner wall facing an interior of the respective hollow shaft and an opposing outer wall and wherein a first universal joint is connectible to the outer wall of the first hollow shaft and a second universal joint is connectible to the inner wall of the second hollow shaft within the second hollow shaft.

4. A drive line apparatus for connection between an output portion of a driving member and an input portion of a driven member, said drive line apparatus comprising:
    a first hollow shaft having at least one open end;
    a second hollow shaft having at least one open end;
    means for rotating said second hollow shaft in unison with the first hollow shaft;
    means for connecting said first hollow shaft to the output portion of the driving member;
    means for connecting said second hollow shaft to the input portion of the driven member, wherein one of said means for connecting said first hollow shaft to the output portion and said means for connecting the second hollow shaft to the input portion is disposed within the second hollow shaft;

a flanged portion extending radially inward from a longitudinal end opposite the at least one open end of the first hollow shaft;

a flanged portion extending radially inward from a longitudinal end opposite the at least one open end of the second hollow shaft wherein each flanged portion has an inner wall facing an interior of the respective hollow shaft and an opposing outer wall and wherein a first universal joint is connectible to the outer wall of the first hollow shaft and a second universal joint is connectible to the inner wall of the second hollow shaft; and wherein the second universal joint is disposed within the second hollow shaft.

5. The drive line apparatus of claim 4 wherein the second hollow shaft is disposed coaxially within said first hollow shaft.

6. The drive line apparatus of claim 4 wherein the first and second hollow shafts are cylindrical.

7. The drive line apparatus of claim 4 wherein said means for rotating said second hollow shaft in unison with the first hollow shaft further comprises:

at least one projection extending from an inner surface of the first hollow shaft.

8. The drive apparatus of claim 7 wherein said means for rotating said second hollow shaft in unison with the first hollow shaft further comprises:

at least one depression defined by an outer surface of the second hollow shaft for receiving said at least one projection.

9. A drive line apparatus for connection between an output portion of a driving member and an input portion of a driven member, said drive line apparatus comprising:

a first hollow shaft having at least one open end;

a second hollow shaft having at least one open end;

means for rotating said second hollow shaft in unison with the first hollow shaft;

first means for connecting said first hollow shaft to one of the output portion of the driving member and the input portion of the driven member; and second means for connecting said second hollow shaft to the other of the input portion of the driven member and the output portion of the driving member, wherein one of the first and second means for connecting is disposed within one of the first and second hollow shafts; wherein the second hollow shaft has a second end with a flanged portion extending radially inward and the first ends of the second hollow shaft and first hollow shaft are adjacent a common longitudinal end of the assembled hollow shafts.

10. The drive line apparatus of claim 9 further comprising:

the first and second hollow shafts disposed coaxially with respect to one another for coaxial simultaneous rotational movement with respect to one another and telescoping axial movement relative to one another.

11. The drive line apparatus of claim 9 further comprising:

the second means for connecting said second hollow shaft including at least a portion of a universal joint.

12. The drive line apparatus of claim 11 further comprising:

the portion of the universal joint is positionable within the second hollow shaft.

13. The drive line apparatus of claim 9 further comprising:

a first universal joint defining the output portion of the driving member;

a second universal joint defining the input portion of the driven member; and the first means for connecting said first hollow shaft including the first universal joint connectible to the flanged portion extending radially inward into the second end of the first hollow shaft.

14. The drive line apparatus of claim 13 further comprising:

the first hollow shaft having a second end with a flanged portion extending radially inward;

each flanged portion having an inner wall facing the interior of the corresponding first and second hollow shafts and an opposing outer wall, such that the first universal joint is connectible to the outer wall of the first hollow member and the second universal joint is connectible to the inner wall of the second hollow shaft.

15. The drive line apparatus of claim 14 further comprising:

the second universal joint positionable within the second hollow shaft when connected to the inner wall of the flanged portion of the second hollow shaft.

16. The drive line apparatus of claim 9 further comprising:

the first and second hollow shafts having cylindrical cross sections transverse to a common longitudinally extending rotational axis.

17. The drive line apparatus of claim 9 further comprising:

the first hollow shaft having an inner surface with at least one projection extending radially inwardly therefrom.

18. The drive apparatus of claim 17 further comprising:

the second hollow shaft having an outer surface with at least one depression extending radially inwardly therefrom for receiving the at least one projection from the first hollow shaft.

19. The drive line apparatus of claim 9 further comprising:

the second hollow shaft having the second end spaced from the open end; and the second means for connecting the second hollow shaft to the other of the input portion of the driven member located at the second end.

* * * * *